US007639866B2

(12) United States Patent
Pomero et al.

(10) Patent No.: US 7,639,866 B2
(45) Date of Patent: Dec. 29, 2009

(54) METHOD OF RADIOGRAPHIC IMAGING FOR THREE-DIMENSIONAL RECONSTRUCTION, AND A COMPUTER PROGRAM AND APPARATUS FOR IMPLEMENTING THE METHOD

(75) Inventors: Vincent Pomero, Paris (FR); Wafa Skalli, Paris (FR); Sylvain Deschenes, Montreal (CA); Jacques de Guise, Montreal (CA); Sébastien LaPorte, Massy (FR); Benoit Godbout, Montreal (CA); Dominic Branchaud, Montreal (CA); André Bleau, Dollard-des-Ormeaux (CA); David Mitton, Le Kremlin Bicetre (FR); Irène Dorion, Paris (FR)

(73) Assignee: Biospace Med, Paris (FR)

(*) Notice: Subject to any disclaimer, the term of this patent is extended or adjusted under 35 U.S.C. 154(b) by 730 days.

(21) Appl. No.: 10/740,915

(22) Filed: Dec. 22, 2003

(65) Prior Publication Data

US 2005/0008219 A1    Jan. 13, 2005

(30) Foreign Application Priority Data

Jun. 10, 2003    (FR) .................................. 03 06962

(51) Int. Cl.
*G06K 9/00* (2006.01)
(52) U.S. Cl. ...................... 382/154; 382/128; 382/132
(58) Field of Classification Search ................. 382/154, 382/128, 132
See application file for complete search history.

(56) References Cited

U.S. PATENT DOCUMENTS 4,630,202 A * 12/1986 Mori ............................ 378/14

| 4,989,142 | A | * | 1/1991 | Crawford | 382/131 |
| 5,223,931 | A | * | 6/1993 | Fernsler et al. | 348/540 |
| 5,828,774 | A | * | 10/1998 | Wang | |
| 5,926,568 | A | * | 7/1999 | Chaney et al. | 382/217 |
| 5,959,302 | A | | 9/1999 | Charpak | |
| 6,370,480 | B1 | * | 4/2002 | Gupta et al. | 702/39 |

(Continued)

FOREIGN PATENT DOCUMENTS

FR    2 754 068    4/1998

(Continued)

OTHER PUBLICATIONS

Delorme et al., "Three-Dimensional Modelling and Rendering of the Human Skeletal Trunk from 2D Radiographic Images," Oct. 4, 1999, IEEE, pp. 497-505.*

(Continued)

*Primary Examiner*—Charles Kim
*Assistant Examiner*—John W Lee
(74) *Attorney, Agent, or Firm*—Stites & Harbison PLLC; Douglas E. Jackson; Stephen J. Weyer

(57) ABSTRACT

A radiographic imaging method for three-dimensional reconstruction in which the three-dimensional shape of a model representing an object is calculated from a geometrical model of the object that is known a priori, and obtained from a confinement volume of the object estimated from a geometrical pattern visible in two images and from knowledge of the positions of the sources. A geometrical model is used that comprises information making it possible using an estimator for the object to establish a geometrical characteristic for the model representing the object.

20 Claims, 3 Drawing Sheets

U.S. PATENT DOCUMENTS

| | | | |
|---|---|---|---|
| 6,608,917 | B1 | 8/2003 | Wei et al. |
| 6,721,444 | B1* | 4/2004 | Gu et al. .................... 382/154 |
| 7,227,981 | B1* | 6/2007 | Fleute et al. ............... 382/132 |
| 2001/0033281 | A1* | 10/2001 | Yoshida et al. .............. 345/420 |
| 2003/0043969 | A1* | 3/2003 | Menhardt .................. 378/210 |
| 2003/0156111 | A1* | 8/2003 | Joshi et al. ................. 345/420 |
| 2003/0160786 | A1* | 8/2003 | Johnson ..................... 345/419 |
| 2004/0264634 | A1* | 12/2004 | Claus et al. .................. 378/21 |
| 2005/0018885 | A1* | 1/2005 | Chen et al. ................. 382/128 |
| 2007/0280522 | A1* | 12/2007 | Sugiyama .................. 382/131 |

FOREIGN PATENT DOCUMENTS

| | | |
|---|---|---|
| FR | 2 798 760 | 3/2001 |
| FR | 2 810 769 | 12/2001 |
| WO | WO 01/52190 | 7/2001 |

OTHER PUBLICATIONS

Petit et al., "Estimation of 3D Location and Orientation of Human Vertebral Facet Joints from Standing digital radiographs," Jul. 1, 1998, Medical and Biological Engineering and Computing, vol. 36, pp. 389-394.*

Thompson et al., "High-Resolution Random Mesh Algorithms for Creating a Probabilistic 3-D Surface Atlas of the Human Brain," Feb. 1996, Academic Press (NeuroImage), vol. 3, pp. 19-34.*

Delorme et al., "Three-Dimensional Modelling and Rendering of the Human Skeletal Trunk from 2D Radiographic Images," Oct. 4, 1999, IEEE, pp. 497-505.*

Petit et al., "Estimation of 3D Location and Orientation of Human Vertebral Facet Joints from Standing digital radiographs," Jul. 1, 1998, Medical and Biological Engineering and Computing, vol. 36, pp. 389-394.*

Thompson et al., "High-Resolution Random Mesh Algorithms for Creating a Probabilistic 3-D Surface Atlas of the Human Brain," Feb. 1996, Academic Press (NeuroImage), vol. 3, pp. 19-34.*

Delorme et al., "Three-Dimensional Modelling and Rendering of the Human Skeletal Trunk from 2D Radiographic Images," Oct. 4, 1999, IEEE, pp. 497-505.*

Delorme et al., "Three-Dimensional Modelling and Rendering of the Human Skeletal Trunk from 2D Radiographic Images", IEEE Comput. Soc. U.S., Oct. 4, 1999, pp. 497-505.

Andre et al., "Approach for the Smoothing of Three-Dimensional Reconstructions . . . ", Medical and Biological Engineering and Computer, vol. 34, No. 3, May 1, 1996, pp. 185-191.

Petit et al., "Estimation of 3D Location and Orientation of Human Vertebral Facet . . . ", Medical and Biological Engineering and Computing, vol. 36, No. 4, Jul. 1, 1998, pp. 389-394.

Pomero et al., "Fast semiautomatic stereoradiographic reconstruction of scoliotic spines using multi-scale image processing and statistical geometric models", International Congress Series 1256 (2003, pp. 207-213.

Pomero et al., "Fast stereo-radiographic 3D-reconstruction of the spine using a geometric and statistic based model", XIXth Congress of the International Society of Biomechanics (ISB), Jul. 6-11, 2003, Dunedin, New Zealand.

Pomero et al., "Fast stereo-radiographic 3D-reconstruction of the spine using a geometric and statistic based model", Archives of Physiology and Biochemistry, Sep. 11, 2003, 111 (supp.):96.

Deschenes et al., "3D Reconstruction of the Human Spine from Bi-Planar Using Multi-Scale Wavelets Analysis and Splines Interpolators for Semi-Automation", Proceedings of SPIE Medical Imaging 2003: Image Processing, vol. 5032.

* cited by examiner

METHOD OF RADIOGRAPHIC IMAGING FOR THREE-DIMENSIONAL RECONSTRUCTION, AND A COMPUTER PROGRAM AND APPARATUS FOR IMPLEMENTING THE METHOD

FIELD OF THE INVENTION

The present invention relates to methods of radio-graphic imaging for three-dimensional reconstruction, and to computer programs and apparatuses for implementing the method.

More particularly, the invention relates to a radio-graphic imaging method for three-dimensional reconstruction, for calculating a three-dimensional model of at least one object to be imaged in a field of observation, said object having at least one characteristic portion, the method including a step during which:

c) the three-dimensional shape of a model representing the object is calculated on the basis of a geometrical model of the object that is known a priori.

BACKGROUND OF THE INVENTION

By way of example, this kind of method is described in French patent application FR 2 810 769 in which a user must manually identify control marks belonging to said objects, which marks may be points, segments, straight lines, arcs, outlines, edges, etc., in each image, thus requiring the user to possess simultaneously: plenty of time; thorough knowledge of anatomy in order to locate the control marks precisely; great accuracy; and good subjective estimation of the bias effects of projection. This large amount of human intervention is particularly limiting on the reproducibility of the reconstruction whenever it is performed by personnel that is not highly specialized.

OBJECTS AND SUMMARY OF THE INVENTION

A particular aim of the present invention is to provide a method in which the intervention of specialists is limited.

To this end, according to the invention, in a method of the kind in question, a step b) is implemented of calculating at least one estimator corresponding to at least one geometrical characteristic of the object on the basis of a confinement volume of said characteristic portion of the object, said confinement volume being estimated from at least one geometrical pattern visible in two two-dimensional radiographic images of the field of observation taken from a source having a position, in two non-parallel image-taking directions, and from said position while taking the image;

said geometrical model comprising information associated with the three-dimensional shapes of objects of the same kind enabling the geometrical characteristic for the model representing the object to be established from the estimator.

By means of these dispositions, the process of identifying numerous marks in each image of the object, which process is subject to errors, is replaced by reliable information about objects of the same kind contained in the geometrical model. It is then quick and easy to recover the shape of the particular model on the basis of a small number of inputs that can be identified by a non-specialist.

In preferred implementations of the invention, one may optionally perform one or more of the following dispositions:

step c) comprises steps of:

c1) estimating a local frame of reference associated with the object on the basis at least of information taken from the geometrical patterns visible in each image;

c2) determining three-dimensional positions of control marks for the object in the local frame of reference by inference on the geometrical model using the estimator; and c3) calculating the three-dimensional shape of the model representing the object by deforming a predetermined generic model corresponding to said object, said generic model having marks that correspond to said control marks, whereby said model representing the object approximates a shape that is close to being an isometric transformation of the generic model while nevertheless maintaining coincidence between the marks of the deformed generic model and said control marks;

said geometrical model is constituted by a database containing geometrical information associated with at least one of the following properties:

the coordinates of control marks for a set of said objects of the same kind; and characteristic dimensions of a set of said objects of the same kind;

step c) is performed by statistical inference on said database by using said estimator as a predictor;

during step b), said confinement volume is determined from a ruled surface defined by at least said geometrical pattern derived from projecting said characteristic portion of the object onto the first image and the trajectory of a first radioactive source while taking the first image, and a ruled surface defined by at least said geometrical pattern derived from projecting said characteristic portion of the object onto the second image and the trajectory of a second radioactive source while taking the second image;

said geometrical patterns are identified manually by a user on each image;

said geometrical patterns are determined by digitally processing each of the images, said geometrical patterns being obtained by analyzing the brightness of the images;

the light intensity obtained for each pixel of each image is divided by a brightness value of a compressed fuzzy image of the same object;

said compressed fuzzy image is obtained by recalibrating for each image mean brightness values for each pixel obtained by taking for each pixel a weighted mean of the brightness values of neighboring pixels;

interference due to at least one interfering anatomical structure is reduced in at least one image by subtracting from said image an attenuating image representative of the influence of said interfering anatomical structure obtained on the basis of a characteristic which is known a priori about said anatomical structure;

the method further comprising a step a) during which said two images are obtained by simultaneous scanning of the field of observation in a scanning direction, by detecting signals from two non-parallel X-ray beams passing through the field of observation and forming an irradiation plan, said scanning direction being non-coplanar with said irradiation plan; and said scanning is appropriately synchronized with detection so that successive signals coming from the same zone of the field of observation are summed during detection.

In another aspect, the invention provides a radio-graphic imaging method for three-dimensional reconstruction, for calculating a three-dimensional model of a first object to be imaged in a field of observation that further comprises at least one second object presenting a three-dimensional relationship with the first object, each of the first and second objects having at least one characteristic portion, the method comprising a step during which:

c) the three-dimensional shape of a model representing the first object is calculated from a geometrical model of the object that is known a priori;

wherein a step b) is implemented during which at least one estimator corresponding at least to said relationship is calculated on the basis of a confinement volume, said confinement volume being estimated from at least one geometrical pattern representative of each object visible in two two-dimensional X-ray images of the field of observation taken from a source having a position in two non-parallel image-taking directions, and from said position while taking the images;

said geometrical model comprising information associated with the three-dimensional shapes of objects of the same kind, enabling the geometrical characteristic for the model representing the first object to be established from the estimator.

In another aspect, the invention provides a radio-graphic imaging apparatus for three-dimensional reconstruction, for calculating a three-dimensional model of at least one object to be imaged in a field of observation, said object including at least one characteristic portion, the apparatus comprising:

c) means for calculating the three-dimensional shape of a model representing the object from a geometrical model of the object that is known a priori; and b) means for calculating at least one estimator corresponding to at least one geometrical characteristic of the object from a confinement volume of said characteristic portion of the object, said confinement volume being estimated from at least one geometrical pattern visible in two two-dimensional radiographic images of the field of observation taken from a source having a position, in two non-parallel image-taking directions, and from said position while taking the images;

said geometrical model comprising information associated with the three-dimensional shapes of objects of the same kind enabling the geometrical characteristic for the model representing the object to be established from the estimator.

According to another aspect, the invention relates to a method of determining a geometrical pattern for a vertebral body to be imaged in a field of observation containing said vertebral body and a neighboring inter-vertebral space, said geometrical pattern being visible in a two-dimensional radiographic image of the field of observation taken from a source in a taking direction, in which the following steps are performed on the image:

γ) estimating side walls derived from projecting each vertebral body onto said image;

δ) estimating at least one zone of least gray level in the image derived from projecting a zone of the field of observation containing said intervertebral space, said zone being substantially orthogonal to the side walls, by analyzing the brightness characteristics of the image; and ε) determining at least one corner of the geometrical pattern as the point of intersection of said intervertebral space with said side wall.

One may optionally perform one or more of the following dispositions:

the following steps are performed prior to step γ):

α) calculating an estimated characteristic line of the vertebral body; and

β) straightening the image by applying a first deformation so that said characteristic line, once straightened, is substantially a straight line segment;

applying steps γ), δ) and ε) to said straightened images to obtain at least one straightened geometrical pattern, and, after step ε):

ζ) obtaining geometrical patterns by applying a second deformation to said straightened geometrical patterns obtained in step ε), the second deformation being such that the pattern obtained by applying it to said straightened image is positioned close to the pattern on the original image;

during step δ):

δ1) a mean brightness value is estimated for each line of pixels in the image orthogonal to said characteristic line in the image plane; and δ2) a projection of said intervertebral space is estimated by applying a brightness threshold to said mean values;

during step γ), projections of the side walls of the vertebral body are estimated by deforming an initial side wall estimated from the geometrical model;

during step γ), said projections of the side walls are estimated by minimizing a cost function indexed on the contrast of the image and a mean side wall of said vertebral body estimated from a database of vertebral bodies;

step α) is modified in that it includes calculating an estimated characteristic line of a portion of the vertebral spine, and during step α), said characteristic line is calculated by interpolating a suitable number of points of said vertebral spine projected on said image as supplied by a user.

According to another aspect, the invention includes such a method for three-dimensional reconstruction using such a method of determining a geometrical pattern on each image.

In yet another aspect, the invention provides a computer program containing portions of program code for executing steps of such methods.

BRIEF DESCRIPTION OF THE DRAWINGS

Other characteristics and advantages of the invention appear from the following description of embodiments given by way of non-limiting example, and with reference to the accompanying drawings.

In the drawings.

MORE DETAILED DESCRIPTION

In the various figures, the same references designate elements that are identical or similar.

Figure 1:
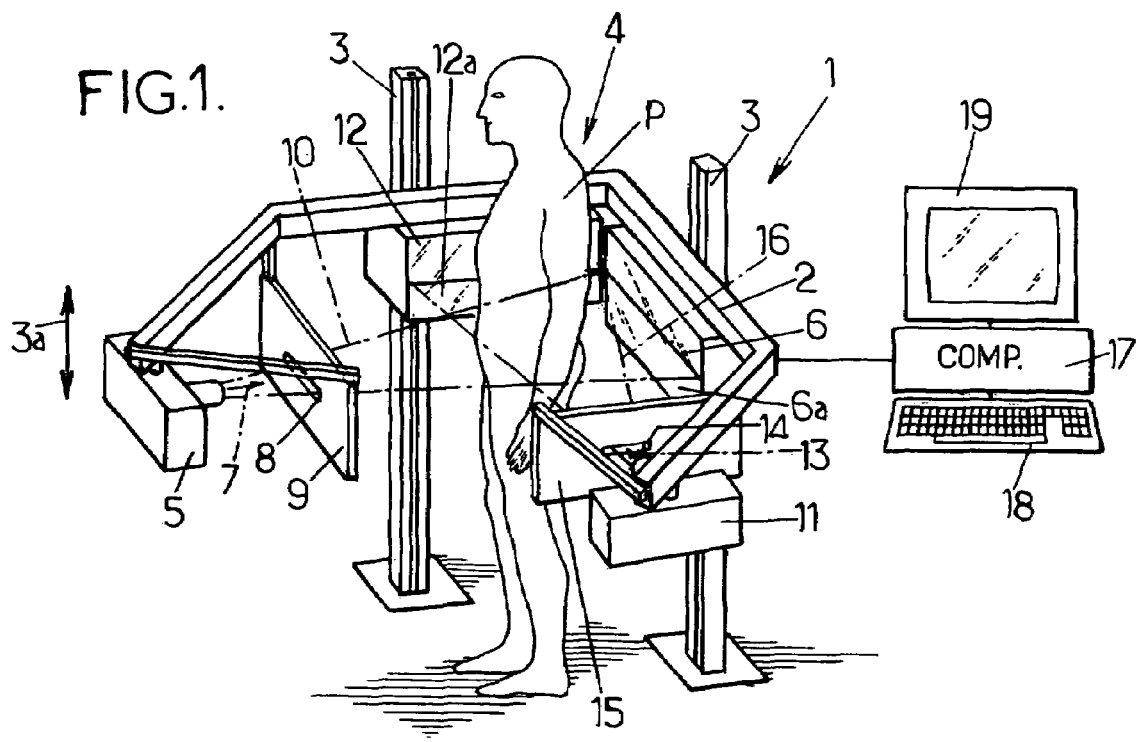
FIG. 1 is a diagrammatic view of radiographic apparatus constituting an embodiment of the invention and enabling a front image and a side image of the patient to be taken.

FIG. 1 shows radiographic apparatus 1 for three-dimensional reconstruction, the apparatus comprising a moving frame 2 displaceable under motor drive along vertical guides 3 in both directions of translation 3a.

The frame surrounds a field of observation 4 in which a patient P can be placed, e.g. standing, for observing the positions of the bones of the patient's skeleton when in the standing position, which can be important for patients suffering from scoliosis, for example.

The moving frame 2 carries a first radioactive source 5 and a first detector 6 which is placed facing the source 5 beyond the field 4, and which comprises at least one horizontal line 6a of detector cells. By way of example, the detector 6 may be a gas detector responsive to low doses of radiation, e.g. as described in documents FR-A-2 749 402 or FR-A-2 754 068. Naturally, other types of detector may optionally be used in the context of the present invention.

The radioactive source 5 is adapted to emit ionizing radiation, in particular X-rays, suitable for being detected by the detector 6 in a image-taking direction 7 that is antero-posterior relative to the patient P, the rays passing through a horizontal slit 8 made through an aiming mask 9 such as a metal plate in order to generate a horizontal beam 10 of ionizing radiation in the field of observation 4.

The moving frame 2 also carries a second radioactive source 11 similar to the source 5 and a second detector 12 similar to the detector 6, disposed facing the source 11 beyond the field 4, and comprising at least one horizontal line 12a of detector cells.

The radioactive source 11 is adapted to emit ionizing radiation in a image-taking direction 13 that is lateral relative to the patient P, passing through a horizontal slit 14 formed in an aiming mask 15 such as a metal plate in order to generate a horizontal beam 16 of ionizing radiation in the field of observation 4.

Naturally, there could be more than two radioactive sources and detectors, and the image-taking directions of these various radioactive sources could, where appropriate, be other than mutually perpendicular, and they need not even be horizontal.

The two detectors 6, 12 are connected to a microcomputer 37 or some other electronic control system fitted with:
- an input interface comprising at least a keyboard 18 and generally also a mouse (not shown); and
- an output interface comprising at least a screen 19.

The microcomputer 37 may also have means for executing a computer program adapted to implement the method described herein.

The microcomputer 37 may also be connected to the motor-driven drive means (not shown) contained in the guide 3, and to the sources 5 and 11, so as to control vertical displacement of the frame and the emission of ionizing radiation.

Detection may be implemented by a purely linear detector (one line of an image at a time), or by a matrix detector having any aspect ratio. The angle of acceptance of the detector, given by the ratio of its working height over the source-to-detector distance serves to provide an estimate of its ability to minimize interfering signals coming from radiation diffused by the patient. A smaller angle of acceptance makes it possible, for a given dose, to improve image quality (less noise), or for comparable image quality, to use a smaller dose. However, too small an angle of acceptance leads to too small a fraction of the X-rays emitted by the source being useful, and thus to a decrease in the speed of sweeping needed to obtain a usable image. A favorable geometrical compromise between these two opposing effects is obtained for an intermediate angle of acceptance, for example a detector of height lying in the range 1 millimeter (mm) to 20 mm placed at 1.5 meters (m) from the source. In order to preserve the separating power in the scanning direction at the same level as the separating power of a purely linear detector, the detector may be segmented into vertical segments that are not greater than the desired resolution.

While sweeping, in order to obtain better resolution, it is also possible to add signals coming from the same portion of the patient but delivered in successive slices at successive moments. Such summing can be performed equally well in an early stage in the process of converting the radiation into a signal (summing electrical charge, analog summing), as in a later stage after the signal has already been digitized. By appropriate synchronization, possibly implemented by the microcomputer 37, this can be achieved, in particular providing it is ensured that the displacement of the assembly during the individual measurement time is equal to the vertical size of a slice, as for example in the context of a transfer-and-integration detector.

The above-described apparatus operates as follows:

The microcomputer 37 is used initially to take two radiographic images of the patient P by causing the field of observation 4 to be scanned by the beams 10 and 16 of ionizing radiation over a height corresponding to the zone of the patient that is to be observed, for example the spine and the pelvis, or indeed the entire skeleton. For this purpose, the frame is preferably displaceable over a height of not less than 70 centimeters (cm), and for example over at least one meter.

Figure 3A:
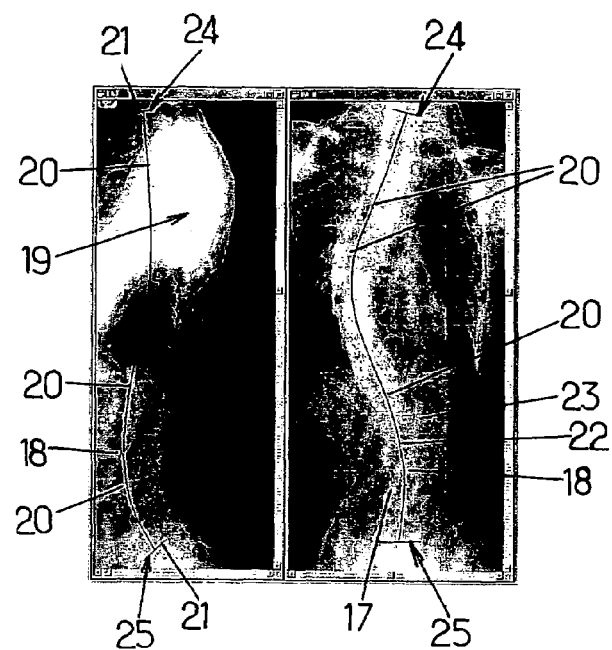
FIG. 3a are diagrams representing front and side X-ray images of the vertebral column of a patient.

During this movement, two digital radiographic images of the portion of the patient under examination are stored in the memory of the microcomputer 37, for example an antero-posterior image and a lateral image respectively, which images can be viewed on the screen 19 of the microcomputer, as shown in FIG. 3a.

The method is described herein with reference to the vertebral column, however a similar method could equally well be used for any simple structure about which a priori knowledge is available, such as a single bone, a single vertebra, a ligament structure, etc., or a set of anatomical structures such as a lower limb or an upper limb, etc.

Figure 2:
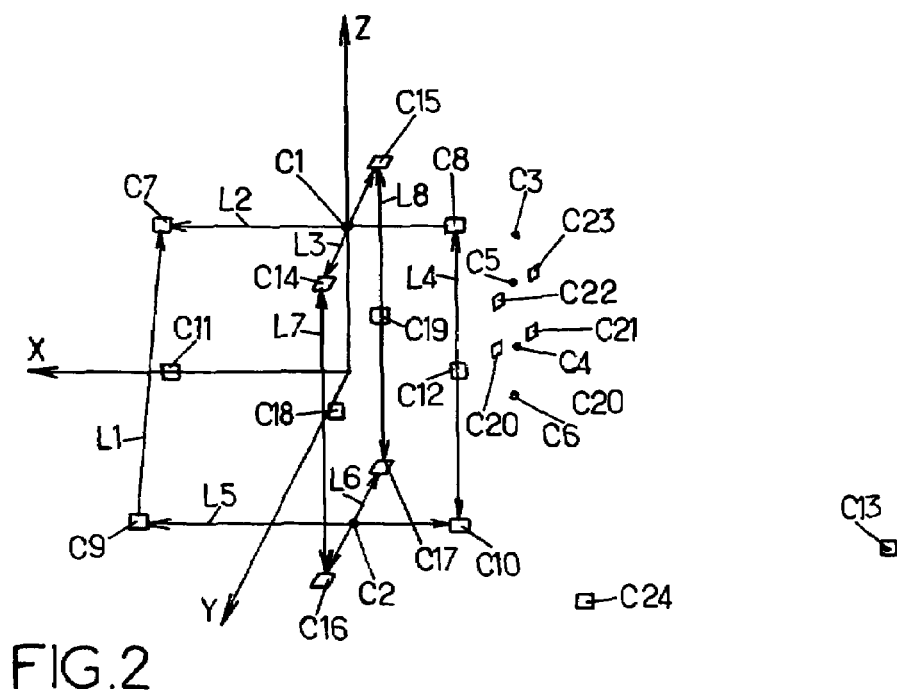
FIG. 2 is a diagrammatic perspective view of a geometrical model associated with a vertebra.

A database concerning objects shown on the radio-graphic images is also available, in particular a database concerning vertebrae, as shown in FIG. 2, and possibly also of other anatomical structures, such as ligaments, etc.

The database may contain data relating to particular reference marks on vertebrae. By way of example, it contains the positions of a score of characteristic points C1 ... C23 of the vertebra, characteristic lengths L1 ... L8 of each vertebra, as shown in FIG. 2, segments, straight lines or arcs that are characteristics of the object, and/or outlines and edges of the object.

The coordinates of characteristic points or lines may be expressed, for example, in a local X, Y, Z frame of reference. In the example described, the axis Z corresponds to the axial direction of the vertebral column, the axis X is determined so that axis X and Z define the antero-posterior plane of the vertebra 20, the axis Y being perpendicular to the above-mentioned axes X and Z. In addition, the origin O of the frame of reference is disposed in the middle between the two axial end faces of the main "tubular" portion of the vertebra, the origin O also being positioned so that the axis Z passes through the upper axial face of the main portion of the vertebra at a mark C1 such that the distance between said mark C1 to the front end C7 of said axial face is equal to about two-thirds of the total distance between the front and rear ends C7 and C8 of the antero-posterior section of said top axial face.

The vertebrae may also be classified in the database in various subcategories, for example as a function of their anatomical positions. For example, the thoracic vertebrae may be distinguished from the cervical vertebrae and from the lumbar vertebrae, or else a database is made available corresponding to each of the vertebrae under consideration in the spine. It is also possible to establish a subset of the database of vertebrae belonging to healthy individuals or to individuals suffering from scoliosis, and similarly it is possible to characterize each vertebra as a function of the weight, the size, the age, or any other type of parameter concerning the individual that is deemed to be necessary.

A geometrical model constructed from the database may take the place of the database. By way of example, the model may include statistical data (means, variances, . . . ) for each parameter of the database, or indeed mathematical equations for determining for a given object the positions of the characteristic points on the basis of values of estimator parameters for said object. The database also contains data relating to the relative positions of the vertebrae in the vertebral column of the particular subject, such as, for example, the angular orientation of the vertebra and the curvature of the spinal column at the level of that vertebra.

A generic model is also available, e.g. established from the database, and defined as a mesh of several hundred to several hundred thousand points of a vertebra.

The two X-ray views shown in FIG. 3a are gray scale images of the portion of the patient's body that is included in the field of observation 4, as projected onto the planes containing the detectors. Projections of the patient's vertebrae 17 are visible in the form of pale zones. In such a pale zone, there can be seen, for example, places where intervertebral spaces 18 lying between two vertebrae 17 are projected as darker zones. Nevertheless, the vertebral column is not necessarily entirely visible, as for example in the lateral view of FIG. 3a where the top portion is not visible because the patient's arm 19 forms a pale zone in which it is difficult to discern the vertebral column.

In each of the two views, it is possible, for example, to identify a certain number of points 20 of the geometrical pattern that results from projecting the structure to be imaged, such as any points that are visible on the central lines of geometrical patterns that result from projecting the vertebral column. It is also possible to identify a few points 21 at the top and bottom ends of each of the patterns in each of the views. By way of example, the points 20 and 21 may be supplied manually by a user. The user need not necessarily input predetermined points 20 and 21, for example particular points situated at predetermined geometrical positions on the top or bottom faces of the vertebrae, but can merely input points having a defined geometrical characteristic, such as belonging approximately to a given line or surface.

The points 20 of each image are interpolated to provide a central line 22 in each view, for example constituted by a set of points spaced apart by a distance of 250 micrometers (µm). This line 22 extends in each view between a top line 24 and a bottom line 25 containing the previously placed points 21. If the points 20 are input by a user, the degree of realism of the line 22 can be monitored by calculating for each new point 20 that is input a new central line 22 and by evaluating the distance between the new central line 22 and the preceding central line 22. The number of points 20 on which the central line 22 is based is sufficient once the distance between two consecutive central lines 22 becomes less than a predetermined value.

A deformation field D is then applied to the entire image in order to straighten out the central lines 22 in each view so that each of them is presented in the form of a segment D(22) extending between the top and bottom straightened portions D(24) and D(25) of the projection of the vertebral column. This thus obviates constraints associated with the curvature of the vertebral column which is specific to the patient, and which might impede the automation method that is implemented, in particular in the event of severe pathological deformation.

For exhaustive viewing of contrast in an imaging environment having a large dynamic range, it is important to include each contrast within a range of gray levels in which the eye responds optimally. This can be achieved effectively by initially creating a fuzzy image, by smoothing the original image, so as to get at each point an average of the gray levels in a vicinity of several millimeters. The fuzzy image is then subtracted from the original image. Thus, contrast contained in pale zones and those included in dark zones which are difficult to perceive by the poor ability of the eye in contexts of too much or too little light, are perceived optimally because they are all situated in zones of intermediate blackness. Nevertheless, merely subtracting the fuzzy image tends to completely flatten out the dynamic range of the image, with all organs appearing with brightness levels that are comparable, thereby making the overall image more difficult to read. It is therefore preferable, prior to performing the above-mentioned operation, to compress the dynamic range of the fuzzy image somewhat (e.g. using a linear function or a gamma function). Subtracting the fuzzy image of reduced dynamic range from the original image serves simultaneously to bring contrast-into favorable ranges of gray and to conserve in the image an overall dynamic range that is compatible with the traditional appearance of a radiological image.

Figure 3B:
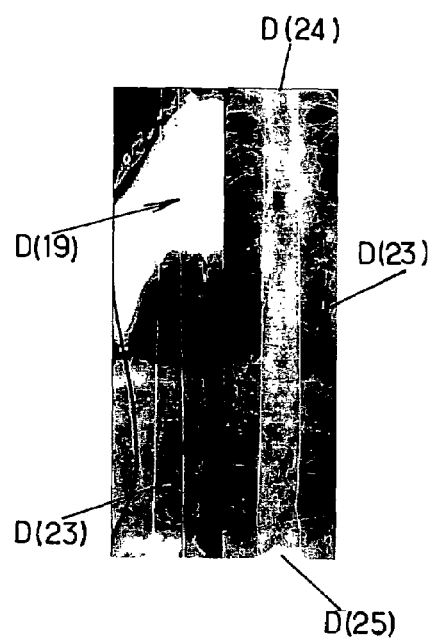
FIG. 3b are diagrammatic views corresponding to the images of FIG. 3a after straightening.

The side walls D(23) of the projected patterns of the vertebral column are then determined. In FIG. 3b, it is possible to begin by defining initial lateral walls as extending on either side of the central line D(22) between the top and bottom lines D(24) and D(25). It is possible by successive iterations to approach the lateral walls D(23) along the projection of the vertebral column starting from initial lateral walls as defined above, for example by relying on the intensity of the light intensity gradient vector in the vicinity of said initial walls. It is also possible to make use of the known geometrical properties of the lateral walls, for example the widths that are typical for the kind of vertebrae under consideration, where such a typical width may be an average, or by making reference to the appropriate subcategory of vertebrae in the database. (depending on the size, the age, the weight, etc. of healthy individuals or those suffering from scoliosis that have been used to feed the database).

Figure 3C:
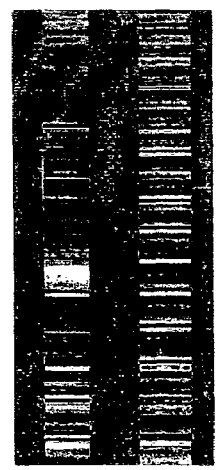
FIG. 3c are diagrams corresponding respectively to the views of FIG. 3b and representing brightness values taken along the vertical axis of FIG. 3b.

Projections of the intervertebral spaces 18 are to be found in the straightened images as follows: in the straightened images, the projections of the intervertebral spaces correspond substantially to dark regions extending horizontally. It is thus possible for each view in FIG. 3b to take the average of the light intensity value on each image line between the two side walls D(23), and to obtain a gray level representation of the kind shown in FIG. 3c, the left-hand and right-hand strips corresponding respectively to the left-hand and right-hand straightened images of FIG. 3b. Since this data is one-dimensional data, it is easily processed by calculation, for example it can be filtered so as to approach as closely as possible to the statistical properties of the vertebral column, as defined by the database. Applying a brightness threshold then makes it possible to find the exact locations of the projections of the intervertebral spaces of the vertebral column being studied. It is possible to make use of statistical information coming from the database, such as the typical heights for the kind of vertebrae under consideration, for example, should the data supplied by the image turn out to be insufficient.

Figure 3D:
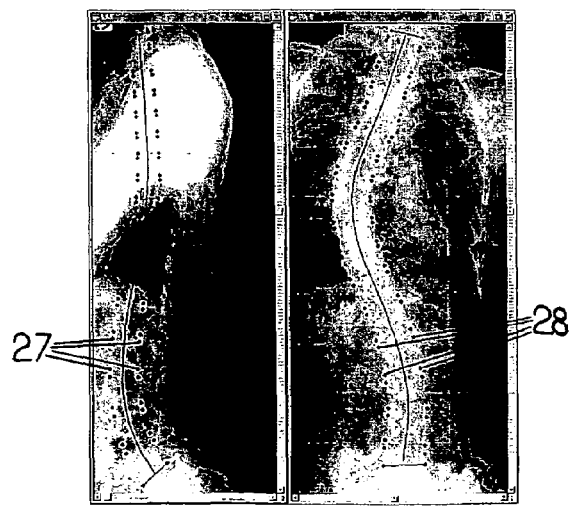
FIG. 3d are diagrammatic views corresponding to FIG. 3a, in which characteristic points of geometrical patterns have been identified.

Then, by applying appropriate deformation, such as the deformation $D^{-1}$ that is the inverse of the deformation D, to the straitened images in which the positions of the projections of the intervertebral spaces have been identified, the positions are obtained as shown in the image of FIG. 3d where in each view each vertebra is represented by four points relating to the four corners 27, 28 of the geometrical pattern corresponding to the projection of the vertebral body.

Alternatively, it is not necessary to make use of a set of deformations D and $D^{-1}$, and instead the corners are detected directly from the non-straightened images of FIG. 3a.

Alternatively, the four corners are merely input manually by a user in each of the views, which does not require accurate anatomical knowledge.

Depending on the object being studied, it is also possible to identify manually or by calculation outlines of patterns in one and/or the other image.

Figure 4A:
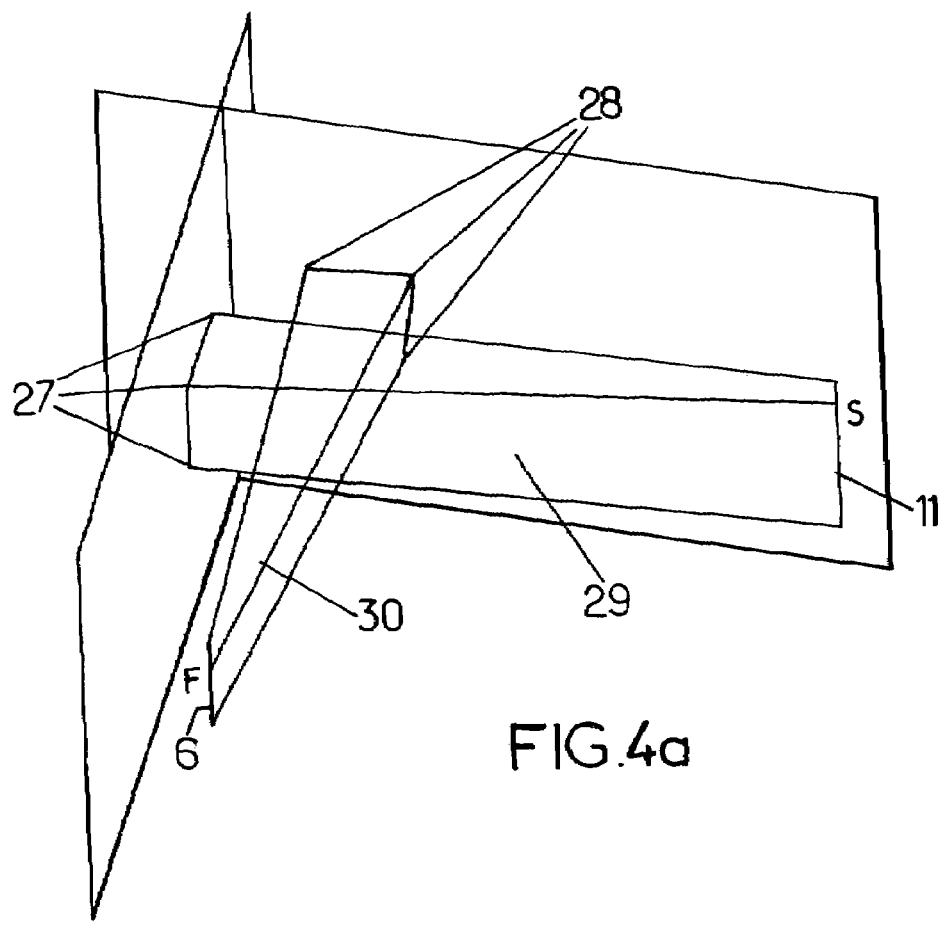
FIGS. 4a and 4b are diagrammatic perspective views showing how the volume of each vertebral body is obtained from the identified points shown in FIG. 3d.
Figure 4B:
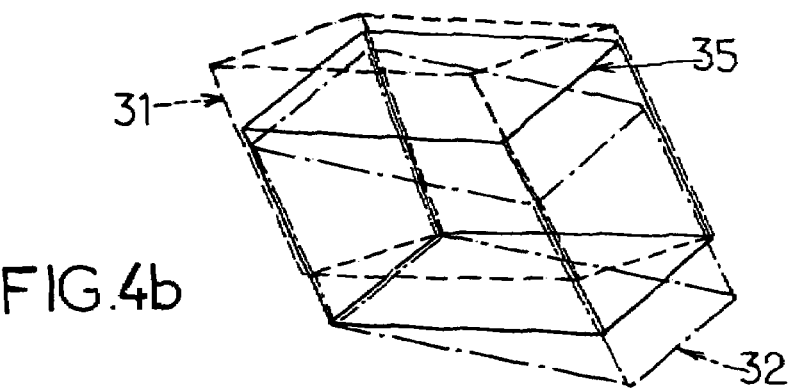

By using the database, a three-dimensional model of the vertebral column is then reconstructed, based on the corners 27, 28 or the outlines as previously obtained. For this purpose, the following operations are performed:

in order to locate the position of a vertebral body in three dimensions, calculating sixteen three-dimensional points as follows: for each view and for each vertebra, defining a ruled surface encompassing the side walls and the top and bottom walls of the geometrical patterns that result from projecting the vertebral bodies. For the sagittal view, the sagittal ruled surface 29 is defined by the four points 27 of the geometrical patterns that result from projecting the vertebral body in the sagittal view, and the line defined by scanning the source 11. The frontal ruled surface 30 is defined in the same way using the four corners 28 and the line defined by scanning the source 5. Eight three-dimensional points are defined as the points of intersection between the edges of the ruled surface 29 and the ruled surface containing the side walls of the ruled surface 30. These eight points form the corners of a sagittal hexahedron 31. In similar manner, a frontal hexahedron 32 is obtained by finding the point of intersection between the edges of the ruled surface 30 and the ruled surfaces containing the side walls of the ruled surface 29. These two hexahedra 31 and 32 are shown in FIG. 4b for the special case of fixed sources of radiation S and F;

obtaining the confinement volume of the vertebral body by extracting pertinent information from the two hexahedra 31 and 32. In particular, the positions and orientations of the lateral facets of the confinement volume are obtained as the mean facets of the hexahedra 31 and 32 associated with each of the sides of the hexahedron. Pertinent facets can be placed at the centers of gravity of the centers of the top facets and of the bottom facets respectively of the two hexahedra 31 and 32, the orientations of the pertinent facets being determined on the basis of the vector products of the vectors normal to the projections of the top and bottom facets respectively of the hexahedra 31 and 32 in the frontal and sagittal views. The points of intersection of these pertinent facets and the lateral facets enable a confinement hexahedron 35 to be defined.

The center of each vertebral body is then calculated as being the center of gravity of the confinement hexahedron 35;

calculating the sagittal and lateral angular orientations of the vertebrae from the projections of the respective confinement hexahedron 35 associated with the vertebrae. Using the curvatures of the central lines of the geometrical patterns that result from the sagittal and frontal projections of the vertebral column, and using information from the database, the axial rotation of each vertebra is estimated. This makes it possible to define a local X, Y, Z frame of reference for each vertebra which is placed at said center of gravity;

using the confinement hexahedron 35 for each vertebra and the calculated angular orientations, the geometrical characteristics of the vertebral body are estimated, e.g. the front, rear, left, and right heights of the vertebral body, and the width and depth of the top and bottom planes of the vertebral body, corresponding to the lengths L1 . . . L8 of each vertebra in the database (FIG. 2). It is not necessarily lengths that are estimated, it being possible optionally to estimate coordinates, areas, etc.;

the positions of the points C1 . . . C23 or other control reference marks of the vertebral body are estimated by statistical inference using said above-determined geometrical characteristics as estimators and using the database, e.g. by linear regression, etc.; this provides the three-dimensional positions of the control marks or points of the object being studied in the local frame of reference of the vertebra, which can be expressed in the overall frame of reference on the basis of the position and the orientation of the center of gravity of the hexahedron, as estimated previously. The control marks may be taken from three-dimensionally-oriented segments, or from any other geometrical primitives; and the three-dimensional shape of a model representing the vertebra in question is calculated, the calculated model being obtained by deforming a generic model obtained from the database, the deformation serving to maintain coincidence between the control marks of the deformed generic model with the previously determined positions in three dimensions of the control marks, and in such a manner that the calculated model is as close as possible to the shape of an isometric transformation of the generic model, this time working on all of the points of the generic model.

In particular, a three-dimensional model of each object under examination can be obtained by the method known as kriging.

The resulting model may then optionally be projected onto the frontal and sagittal planes and deformed again with precision so as to obtain a perfect match between its projections and the X-ray images.

In the special case of the vertebral column, the confinement volume may be determined from the geometrical pattern associated with the projection of the vertebral body in each image, however it is also possible to make use of identification of the geometrical pattern associated with projecting the intervertebral spaces between pairs of adjacent vertebrae in order to evaluate an estimator for one, or the other, or both of the corresponding vertebrae.

One particular method of reconstruction is described herein, however any method in which the model is determined using an estimator determined from a confinement volume can be covered by the invention. In particular, a generic model may be selected in a database using this estimator, the model being projected in iterative manner onto the images of the object and being deformed so as to approach the images of the object.

As shown in FIG. 3, for certain applications, certain structures can interfere with viewing the objects, e.g. the arm can interfere with the upper thoracic vertebrae. Once the bony envelope has been reconstructed, it is possible on the basis of knowledge of the beam parameters (such as, for example, the voltage and the current powering the source, the distance between the source and the object, etc.), and by making certain assumptions about the homogeneous nature of the bone that is acting as a screen, to determine the radiological behavior of said bone and thus to determine for each point of each of the plane views, what fraction of the attenuation can be attributed to said screen-forming bones. It is then possible, e.g. merely by subtraction, to reconstitute more readable images in which the screen-forming bone structures appear in attenuated form. This applies, for example, to eliminating bones such as the humerus in order to make the vertebrae more legible, or to eliminate a vertebra in order to view an intervertebral disk more clearly.

An effective examination tool is thus provided capable of being used for imaging any portion of the human or animal body, in particular a portion of bone or cartilage, which tool is useful in particular for diagnosing scoliosis or for pre- and post-operative monitoring when surgery is to be performed.

Naturally, it is also possible to calculate certain predetermined clinical indices associated either with the geometry of the assembly under examination, or else, where appropriate, the composition or the density of the objects being examined, as estimated from the radio-graphic images.

Where appropriate, the radiographic apparatus 1 may be adapted to examining a prone patient, which can be essential in the field of traumatology. Under such circumstances, the patient P is prone on a supporting table, and the beams of ionizing radiation 10 and 16 both occupy a vertical plane, with the sources 5, 11 moving horizontally together with the detectors 6, 12.

Naturally, it is possible to generate two non-parallel ionizing beams using two masks (e.g. two distinct slits made in a single metal plate) extending from a single radioactive source in order to enable the invention to be implemented, and using as before two detectors disposed facing the two beams and displaceable synchronously with the source and the masks.

What is claimed is:

1. A radiographic imaging method for three-dimensional reconstruction, for calculating a three-dimensional model of at least one object to be imaged in a field of observation, said object having at least one characteristic portion, the method including the following steps:
   b1) estimating a confinement hexahedron of said characteristic portion of the object from at least one geometrical pattern visible in two two-dimensional radiographic images of the field of observation taken from a source having a position in two non-parallel image-taking directions, and from said position while taking the image;
   b2) calculating at least one estimator corresponding to at least one geometrical characteristic of the object on the basis of said confinement hexahedron, said estimator being an estimation of a height, width, depth, length, area or coordinate of the object
   c) providing an a priori knowledge base of the object comprising information associated with the three-dimensional shapes of objects of the same kind as the object to be imaged, enabling a geometrical characteristic for the model representing the object to be established from an estimator of a geometrical characteristic of the object; and
   d) calculating the three-dimensional shape of a model representing the object on the basis of said a priori knowledge base by establishing the geometrical characteristic for the model representing the object from the estimator.

2. A method according to claim 1, in which step d) comprises steps of:
   d1) estimating a local frame of reference associated with the object on the basis at least of information taken from the geometrical patterns visible in each image;
   d2) determining three-dimensional positions of control marks for the object in the local frame of reference by inference on the a priori knowledge base using the estimator; and
   d3) calculating the three-dimensional shape of the model representing the object by deforming a predetermined generic model corresponding to said object, said generic model having marks that correspond to said control marks, whereby said model representing the object approximates a shape that is close to being an isometric transformation of the generic model, while nevertheless maintaining coincidence between the marks of the deformed generic model and said control marks.

3. A method according to claim 1, in which said a priori knowledge base is constituted by a database containing geometrical information associated with at least one of the following properties:
   the coordinates of control marks for a set of said objects of the same kind; and
   characteristic dimensions of a set of said objects of the same kind.

4. A method according to claim 3, in which step d) is performed by statistical inference on said database by using said estimator as a predictor.

5. A method according to claim 1, in which, during step b1), said confinement hexahedron is determined from a ruled surface defined by at least said geometrical pattern derived from projecting said characteristic portion of the object onto the first image and the trajectory of a first radioactive source while taking the first image, and a ruled surface defined by at least said geometrical pattern derived from projecting said characteristic portion of the object onto the second image and the trajectory of a second radioactive source while taking the second image.

6. A method according to claim 5, in which said geometrical patterns are identified manually by a user on each image.

7. A method according to claim 5, in which said geometrical patterns are determined by digitally processing each of the images, said geometrical patterns being obtained by analyzing the brightness of the images.

8. A method according to claim 1, in which the light intensity obtained for each pixel of each image is divided by a brightness value of a compressed fuzzy image of the same object 9. A method according to claim 8, in which said compressed fuzzy image is obtained by recalibrating for each image mean brightness values for each pixel obtained by taking for each pixel a weighted mean of the brightness values of neighboring pixels.

10. A method according to claim 1, in which interference due to at least one interfering anatomical structure is reduced in at least one image by subtracting from said image an attenuating image representative of the influence of said interfering anatomical structure obtained on the basis of a characteristic which is known a priori about said anatomical structure.

11. A method according to claim 1, further comprising a step a) during which said two images are obtained by simultaneous scanning of the field of observation in a scanning direction, by detecting signals from two non-parallel X-ray beams passing through the field of observation and forming an irradiation plan, said scanning direction being non-coplanar with said irradiation plan.

12. A method according to claim 11, in which said scanning is appropriately synchronized with detection so that successive signals coming from the same zone of the field of observation are summed during detection.

13. A radiographic imaging method for three-dimensional reconstruction, for calculating a three-dimensional model of a first object to be imaged in a field of observation that further comprises at least one second object presenting a three-dimensional relationship with the first object, each of the first and second objects having at least one characteristic portion, the method comprising the following steps:
   b1) estimating a confinement volume from at least one geometrical pattern representative of each object visible in two two-dimensional X-ray images of the field of observation taken from a source having a position in two non-parallel image-taking directions, and from said position while taking the images;
   b2) calculating at least one estimator corresponding at least to said relationship on the basis of said confinement volume,
   c) providing an a priori knowledge base comprising information associated with the three-dimensional shapes of objects of the same kind as the object to be imaged, enabling a geometrical characteristic for the model representing the first object to be established from an estimator of a relationship between the two objects, and
   d) calculating the three-dimensional shape of a model representing the first object from said a priori knowledge base by establishing the geometrical characteristic for the model representing the first object from the estimator.

14. Radiographic imaging apparatus for three-dimensional reconstruction, for calculating a three-dimensional model of at least one object to be imaged in a field of observation, said object including at least one characteristic portion, the apparatus comprising:
   B1) means for estimating a confinement hexahedron of a characteristic portion of the object from at least one geometrical pattern visible in two two-dimensional radiographic images of the field of observation taken from a source having a position, in two non-parallel image-taking directions, and from said position while taking the images;
   B2) means for calculating at least one estimator corresponding to at least one geometrical characteristic of the object from said confinement volume hexahedron said estimator being an estimator of a height, width, depth, length, area or coordinate of the object,
   C) an a priori knowledge base comprising information associated with the three-dimensional shapes of objects of the same kind as the object to be imaged, enabling a geometrical characteristic for the model representing the object to be established from an estimator of a geometrical characteristic of the object,
   D) means for calculating the three-dimensional shape of a model representing the object from said a priori knowledge base, adapted to establish the geometrical characteristic for the model representing the object to be established from the estimator.

15. A computer-readable medium comprising a computer program including portions of program code for executing the steps of the method according to claim 1.

16. The method of claim 1, further comprising displaying the 3-dimensional model on a computer screen.

17. The method of claim 1, further comprising storing the 3-dimensional model in computer readable memory or on a computer readable medium.

18. The method of claim 13, further comprising displaying the 3-dimensional model on a computer screen.

19. The method of claim 13, further comprising storing the 3-dimensional model in computer readable memory or on a computer readable medium.

20. The method of claim 15, wherein the program code further executes displaying the 3-dimensional model on a computer screen.

* * * * *

UNITED STATES PATENT AND TRADEMARK OFFICE
CERTIFICATE OF CORRECTION

PATENT NO. : 7,639,866 B2 Page 1 of 1
APPLICATION NO. : 10/740915
DATED : December 29, 2009
INVENTOR(S) : Pomero et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Ninth Day of November, 2010

David J. Kappos
*Director of the United States Patent and Trademark Office*